United States Patent [19]
Grube et al.

[11] Patent Number: 5,179,720
[45] Date of Patent: Jan. 12, 1993

[54] METHOD AND APPARATUS FOR EXTENDED COVERAGE OF A TRUNKED RADIO COMMUNICATIONS SYSTEM

[75] Inventors: Gary W. Grube, Palatine, Ill.; Carl B. Olson, San Carlos, Calif.

[73] Assignee: Motorola, Inc., Schaumburg, Ill.

[21] Appl. No.: 483,841

[22] Filed: Feb. 23, 1990

[51] Int. Cl.⁵ .......................... H04B 7/14; H04Q 9/00
[52] U.S. Cl. .......................................... 455/16; 455/17; 455/18; 455/20; 455/33.4; 455/34.1; 455/54.2; 455/56.1; 379/59
[58] Field of Search .................................. 455/9, 15-17, 455/18, 20, 33, 34, 54, 56, 33.1, 33.2, 33.3, 33.4, 54.1, 54.2, 56.1; 375/3, 4; 379/59-60; 370/11

[56] References Cited

U.S. PATENT DOCUMENTS

| | | | |
|---|---|---|---|
| 3,487,310 | 12/1969 | Bateman et al. | 455/15 |
| 4,578,815 | 3/1986 | Persinotti | 455/15 |
| 4,783,843 | 11/1988 | Leff et al. | 455/20 |
| 4,941,200 | 7/1990 | Leslie et al. | 455/20 |

FOREIGN PATENT DOCUMENTS 0154827 9/1984 Japan .................................... 455/20

OTHER PUBLICATIONS

"Extend-A-Cell TM Low Power Boosters", *The Antenna Specialists Co.*, ©1988, pp. 1-6.

Primary Examiner—Curtis Kuntz
Assistant Examiner—Andrew Faile
Attorney, Agent, or Firm—Joseph P. Krause; Steven G. Parmelee

[57] ABSTRACT

A trunked radio system range extender extends the range of a trunked radio system by having a second repeater station monitor the control channel for the trunked radio system detect and decode control information and rebroadcast it on to a second control resource. Communications resources from the first trunked radio system are similarly mapped into a second set of communications resources for subsequent broadcast throughout an extended geographic range. The extending repeater station uses the control resource from the first repeater station.

11 Claims, 1 Drawing Sheet

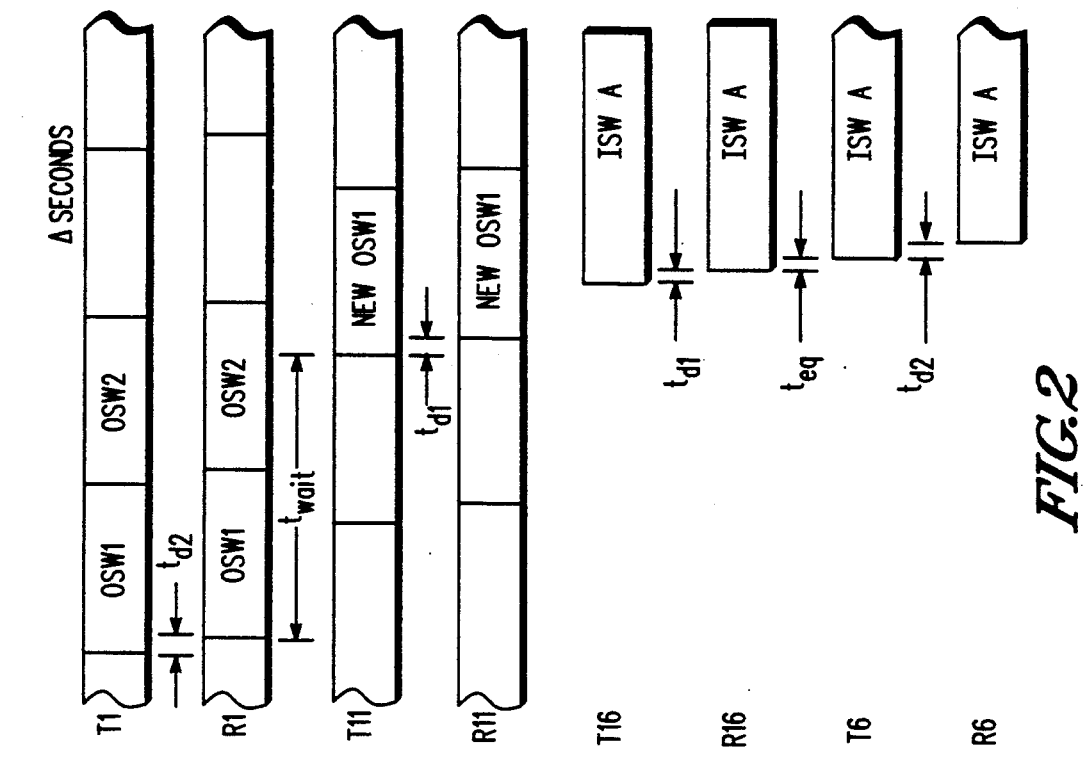
FIG. 2
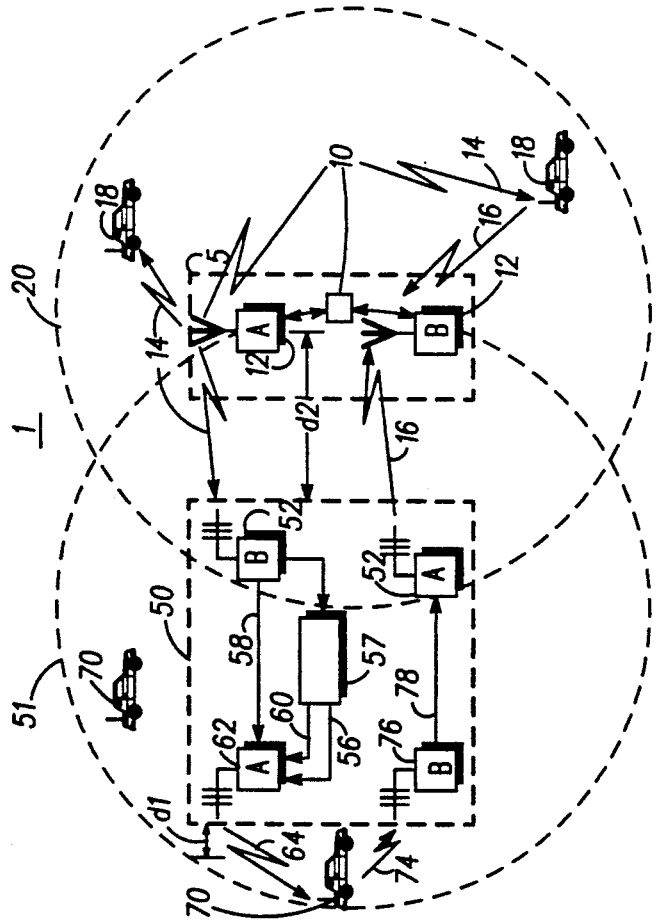
FIG. 1
FIG. 3

METHOD AND APPARATUS FOR EXTENDED COVERAGE OF A TRUNKED RADIO COMMUNICATIONS SYSTEM

BACKGROUND OF THE INVENTION

This invention relates to radio communications systems. In particular this invention relates to trunked radio systems and specifically to a method and apparatus for extending the geographic coverage area provided by a trunked radio system.

Trunked radio systems provide limited range two-way radio communications to subscriber radios that are within the geographic coverage area of a repeater station for the system. Subscriber radios of a trunked radio system time-share a limited number of radio communication frequencies with other radios, including other unrelated radios under the direction of a controller for the system. The central controller temporarily assigns and re-assigns available frequencies to certain radios based on a variety of factors, which are irrelevant to this invention.

When a subscriber radio requests a communication channel, it sends a request for a communication channel to the resource controller for the system via a control channel. (The control channel is a radio channel that carries trunked radio system commands and data. The resource controller continuously send outbound signalling words (OSW's) to the subscriber radios and the subscriber units send inbound signalling words (ISW's) to the resource controller on the control channel when they request service. The control channel, as well as the communication channels for the trunked radio system, are referred to hereafter as a control resource and communication resources respectively since the control channel and communication channels might include distinct frequency bands using distinct modulation techniques as well as a particular time slot in a TDM frame or other uniquely identifiable channel for example.) This controller, which is more properly called a communication resource controller and typically includes a computer, receives requests for communication resources from subscriber radios via ISW's on the control resource and, using OSW's, directs subscriber radios to shift to a particular frequency and monitor frequency for communications traffic.

Large trunked radio systems might include multiple repeaters distributed around a geographic region to expand the area over which communication can be maintained. The repeaters broadcast and receive the OSW's and ISW's as well as the communications information. To expand the geographic coverage area, a repeater is usually added in or near the region where extended communication is desired. If the new repeater is beyond the range of the existing system, it must be linked to the resource controller by either a dedicated microwave link, dedicated phone line or other communication path. Microwave links and phone lines can be expensive to install and maintain however, and a method and apparatus for expanding the geographic coverage area of a trunked radio system that reduces the cost of prior art range expansion techniques would be an improvement over the prior art.

SUMMARY OF THE INVENTION

There is provided a trunked radio system extender that extends the geographic coverage area of a trunked radio system to a second area by converting signals on the existing control resources and communications resources of the existing trunked radio system to a form that is compatible with a second trunked radio system. The second trunked radio system acts as an extension of the first system by having signals of the first system mapped into the second system and having signals from the second system mapped into the first system.

For example, signals on the existing control resource are received at a new repeater, within the coverage area of the first trunked system but near the area whereat new coverage is desired. The new repeater converts or maps the information in the first control resource control resource that corresponds to the resources of the second coverage area. The new control resource is broadcast from the new repeater throughout the new area. Communication resource contents are mapped to new communications resources by a new repeater as well. A subscriber radio, (hereafter referred to as communication unit) must be able to monitor the control resource for the base trunked radio system and the control resource for the expansion repeater. Communication units must be able to communicate on two sets of communications resources: one set corresponding to the base system, the second set corresponding to the expansion repeater.

The secondary repeater station must of course be within the geographic coverage area of the base trunked radio system and will preferably lay near the extreme ranges of the coverage area. This outlying secondary repeater station monitors channel of the trunked radio system, decodes the trunking control information and adjusts the information to correspond to a second of communication resources. (For example, an instruction to a particular radio $R_1$ broadcast as an OSW on control resource $C_1$ that the radio jump to a particular frequency, $f_1$, will be changed by the secondary repeater to an instruction broadcast to radio $R_1$ as an OSW on control $C_{1+\Delta}$ that radio $R_1$ jump to a frequency $F_{1+\Delta}$.)

To support requestes for service from communication units in the extended geographic coverage area, the secondary repeater station receives ISW's from mobile units within its geographic range of coverage and takes this incoming signalling control word information and remaps it to frequencies and values that the base trunked radio system will recognize and expect. (An ISW request for service on control resource $C_{1+\Delta}$ from radio $R_1$ will be changed by the secondary repeater to a request for service onto control resource $C_1$ and rebroadcast to the central controller for the trunked radio system.)

Communications resource are re-mapped by the secondary repeater in a similar manner. A set of available communication resources in the trunked system is mapped to a second set of available communication resources used in the expanded coverage area.

BRIEF DESCRIPTION OF THE DRAWINGS

FIG. 1 shows a block diagram of the trunked radios system extender.

FIG. 2 shows a timing diagram showing the relative timing relationship of signalling words generated by the system in FIG.1

FIG. 3 shows the format of OSW's and ISW's of the base and expanded system.

DETAIL DESCRIPTION OF THE EMBODIMENT

FIG. 1 shows a simplified block diagram of a trunked radio communications system (1) that provides radio communication between subscriber units (18) throughout a first geographic area (20) and between other subscriber units (70) throughout a second, extended geographic area (51). The trunked radio system (1) is comprised of a first trunked radio site (5) (also referred to herein as a base system and, as a primary site or system) that includes a communications resource controller, (10) which manages communication resources for the entire system (1) and that is coupled to a repeater (12) (The repeater (12) is shown for illustration purposes as a separate transmitter (A) and a receiver (B)). While the communications resource controller (10) shown in FIG. 1 is coupled to a single repeater, other trunked radio systems in operation today would typically include multiple repeater stations coupled to the communications resource controller (10) through microwave links, telephone lines or other dedicated communication media, not shown in FIG. 1 but which might be made unnecessary by this invention.

The base (5) broadcasts its OSWs (14) on its control resource from transmitter section (A) of the repeater (12). Subscriber communications units (18) within the geographic coverage area (20) monitoring the control resource of the base (5) may respond to these OSW's (14) by sending ISW's (16) to receiver section (B) via the control resource of the base system (5). (The OSW's and ISW's will generally include at least two data fields, the first data field being used to identify the group and communication privileges afforded to mobiles associated with that group. The second data field will typically be a channel ID field which may contain the designation of the channel to which the radio identified by the first field is to monitor and transmit upon when it is communicating with functionally related communication units.) Voice communication between the communication unit (18) and the base system (5) is accomplished in a similar fashion. Radio signal on a first communications resource (perhaps of a first frequency, modulation method, TDM time slot etc.) might be sent first from the transmitter (A) which are received and demodulated by the subscriber units. The subscriber units can respond (or alternatively initiate) on a second communication resource, (perhaps the same or different frequency, modulation method, TDM time slot ect.) whereupon communications have been established.

The coverage area (20) of the base system (5) can be extended throughout a second area (51) using a trunking system extender (50) as shown in FIG. 1. The trunking system extender provides virtually a second trunking system, servicing its own geographic coverage area (51). The trunking system extender provides a second control resource having a predetermined relationship to the first control resource upon which control signals (OSW's and ISW's) are transferred to direct usage of a second set of communication resources.

The trunking system extender (50) is preferably located just within the coverage area (20) of the base system (5) and includes at least two transmitter units (52A and 62) and two receiver units (52B and 76). At least one transmitter (62) and one receiver (52B) in combination with an extender controller (57) comprise a secondary repeater station, which manage the communication resource used in the extended communication area (51).

The secondary repeater station converts OSW's and communication resource information from the base system (5) to be compatible with the control resource and communication resource used in the extended area (51). Both the control resource OSW's (14) from the base system (5) and the communication resource of the base system are translated by the extender controller (57) in combination with the receiver (52B) (which detects the OSW's) and the transmitter (62) (which broadcasts the new OSW's). The extender controller (57) is provided with the means for evaluating data fields of OSW's received by the receiver 52B and translating information in the old OSW's into new OSW's for the extended area (51).

FIG. 3 shows and "old" OSW including group ID and assigned channel ID. The "new" OSW shows the new assigned channel ID produced by mapping or translating the old communication resources to the new. Translation of the old OSW produces a new OSW that is identical in every respect expect that the assigned channel has been charged. Users of communication resource 100 in the base system are mapped to communication resource 200 in the extended system.

Actual communication signals are mapped from the base system (5) to the extended area (51) in a similar fashion. For example, assume that a communication unit in the base system (18) is communicating on some communication resource identified simply as communication resource number 100 and that it sends a transmission for a communication unit (70) in the extended area (51), which is out of range of the base system (5) and therefore cannot detect communication resource 100. The communication unit (70) in the extended area can however respond to the secondary repeater on some other communication resource, 200. Information from the communication unit (18) in the base system is received from the communication unit (18) on communication resource 100 (not shown in FIG. 1, but which could be radio frequency channel) at the receiver (B) of the first repeater (12). The receiver couples the information it receives to the transmitter section (A) which rebroadcasts the information out onto communication resource 100 as outgoing information. Traffic on communication resource 100 is received at receiver 52B, demodulated and frequency shifted to communication resource 200 (not shown in FIG. 1, but which could be radio frequency channel) by the extender (57) such that the mobile unit (70) monitoring communication resource 200 receives the transmission from the subscriber 18. The communication unit 70 can respond to communication unit 18 by transmitting on communication resource 200 to another receiver (76) monitoring communication resource 200. The receiver (76) monitoring communication resource 200 has an output (78) which is frequency shifted to communication resource 100 at another transmitter (52A) and rebroadcast on communication resource 100 by the transmitter 52A.

FIG. 2 shows a simplified timing diagram of the sequence of signals expected for signalling words passed between the base system (5) and the trunking system extender (50) shown in FIG. 1. Outbound signalling words, OWS1, OSW2, etc. on a first transmit frequency designated as T1 are continuously broadcast from the transmitter section (A) of the first repeater station (12). These outbound signalling words (14 in FIG. 1) are recurrent time slotS split into different data fields, with each field containing predetermined types of information, such as the information shown in FIG. 3.

Because the first repeater station (12) is separated from the outlying repeater station (52) by a finite distance designated as $d_2$ in FIG. 1, there is a propagation time designed as $T_{d2}$ in FIG. 2 required for the outbound signalling word OSW1 to reach the secondary repeater station (52). The receiver section (B) of the secondary repeater station (52) continuously decodes the outbound signaling words that it receives from the first repeater station (12).

The secondary repeater station (52) decodes the outbound signalling word but in the extended controller (57) and generates a new outbound signaling word (64 in FIG. 1) which is then coupled to a second transmitted station (62) where it is broadcast throughout the secondary geographic coverage area (51). The new outbound signalling word, new OSW1 in FIG. 2, is not broadcast from the secondary transmitter (62) until aa wait period, designated $T_{wait}$ in FIG. 2 is allowed to ellapse. (The significance of $T_{wait}$ will become apparent in the following discussion.) The new outbound signalling word, new OSW1, is rebroadcast from the transmitter section (62) on a new frequency designated T11. Upon receipt of the new outbound signalling word the communication unit (70) (which is now out range of the first repeater station (12)) detects the outbound signalling word and decodes it and takes any appropriate action, (monitoring a pre-identified communication resource for information from another communication unit for example).

If the communication unit (70) desires communication with another communication unit, the communication unit (70) broadcast an ISW, ISW A on a transmit frequency T16. The inbound signalling word ISW A is received at the receiver 76. This receiver (76) detects and decodes the inbound signaling word and maps the frequency of the inbound signalling word to the frequency of operation of the control resource for the first repeater station (12). The inbound signalling word (74) from communication unit (70) received by the receiver (76) is rebroadcast by the transmitter section A by the repeater station (52) back to the receiver section B of the first repeater (12).

The receipt of the inbound signalling word from the communication unit (70) at the receiver 76 and the subsequent rebroadcast of the new signalling word on the control resource from the secondary repeater station (52) will be accompanied by the propagation delay through the secondary repeater station (52), this propagation delay is $T_{eq}$. $T_{eq}$ will normally be the time required to detect the data in the inbound signalling word and convert it to some new frequency for broadcast from the transmitter station A of the secondary repeater station (52).

After the ISW that originated from the communication unit (70) has broadcast from the transmitter section A of the repeater (52) there will be a propagation delay designated $T_{d2}$ associated with transmission from the transmitter A repeater (52) to the receiver B of the repeater (12).

The depiction shown in FIG. 1 is intended to include depiction of the architecture for trunked radio system that use identical frequencies to handle both the control signals and the communication information. As such the communication resource and the control resource would be identical with the outbound signalling word and the inbound signalling words taking place in the first time interval on the communication resource thereafter actual communication information being exchanged in the absence of the signalling words.

What is claimed is:

1. In trunked radio system providing radio communications to primary communication units in a first geographic coverage area and including:
   a communications resource controller means for assigning communications resources from the first set of communication resources to said primary communication units;
   a first repeater station coupled to said communication resource controller transmitting outbound signalling word (OSW) control signals on the first control resource to at least some of said primary communication units, which OSW control signal comprise channel assignment information, and receiving inbound signalling word (ISW) control signals from any primary communication units on said first control resource, said first repeater covering the first geographic coverage area;
   an improvement comprising:
      trucking system extender means for extending communications coverage od said trunked radio system to a second geographic coverage area, said trucking system extender means comprised of:
         secondary repeater station means, located within the first geographic coverage area of said first repeater station, for receiving the OSW control signals from said first repeater station on said first control resource, for converting at least said channel assignment information of said receiver OSW control signals to produce new OSW control signals, and for transmitting said new OSW control signals from said second repeater station to secondary communication units located substantially throughout said second geographic coverage area on at least a second control resource,
         and for receiving ISW control words on said second control resource from said secondary communication units, and for re-transmitting ISW control words to said first repeater station on said first control resource.

2. The trunked radio system of claim 1 where said trucking system extended means further includes:
   first communications channel translation means receiving communication information from said first repeater on a first communications resource of said first set of communications resources and for re-transmitting said communication information substantially throughout said second geographic region on a first communications resource of a second set of communications resources; and
   second communications channel translation means for receiving communication information on the first communications resource of said second set of communications resources and for re-transmitting said communication information to said first repeater on a first communications of said first set of communications resources;
   whereby, at least one of said primary communication units monitoring said first control resource and communicating on a communications resource of said first set of communication resources is able to exchange information with at least one of said secondary communication units in said second geographic area monitoring a second control resource and communicating on a communication resource of said second set of communication resources.

3. The trunked radio system of claim 1 where said secondary repeater station means includes correlation means for correlating said first control resource to said second to said second control resource.

4. The trunked radio system of claim 2 where said communications channel translation means includes means for mapping said first communications resource to a predetermined communications resource of said second set of communications resources.

5. The trunked radio system of claim 2 where said second communications channel translation means includes means for correlating said first communications resource of said second set of communication resources to a predetermined communications resource of said first set of communications resources.

6. The trunked radio system of claim 1 where said trunking system extender further includes:
OSW delay means for temporally delaying transmission of said new OSW control signals after receipt of said received OSW control signal from said first repeater station.

7. In a trunked radio system providing radio communications to primary communication units in a first geographic coverage area and including:
communication resource controller means for assigning communication resources from a first set of communication resources to the primary communication units;
a first repeater station coupled to said communication resource controller means transmitting outbound signalling word (OSW) control signals on a first control resource to said primary communication units, which OSW control signals comprise channel assignment information, and receiving inbound signalling word (ISW) control signals from said primary communication units on said first control resource;
a plurality of said primary communication units monitoring at least said first control resource and capable of providing voice communications on at least one communication resource of said first set of communication resources in response to control signals on said first control resource;
a method of extending communications coverage of the trunked radio system to a second geographic coverage area substantially adjacent to said first geographic coverage area comprising:
providing a secondary repeater station located within said first geographic coverage area, said secondary repeater station providing at least a second control resource and a second set of communication resources;
at said secondary repeater station, receiving OSW control signals from said first repeater station on said first control resource;
converting at least said channel assignment information of said received OSW control signals to produce new OSW control words;
transmitting said new OSW control words to secondary communication units located substantially throughout said second geographic coverage area on said second control resource; and
receiving ISW control signals on said second control resource from any of the secondary communication units, and for retransmitting ISW control signals to said first repeater station on said first control resource.

8. The method of claim 7 further including:
translating primary communication information from said first repeater on a first communication resource of said first set of communication resources to a second communication resource of said second set of communication resources;
re-transmitting said translated primary communication information substantially throughout said second geographic coverage area; and
translating secondary communication information from said second geographic coverage area on said second communication resource resources to said first communication resource and re-transmitting said translated secondary communication information to said first repeater.

9. The method of claim 8 including the step of mapping said first communication resource to a predetermined communication resource of said second set of communication resources.

10. The method of claim 8 including the step of mapping said second communication resource resources to a predetermined communication resource of said first set of communication resources.

11. The method of claim 7 including the step of:
delaying transmission of said new OSW control words.

* * * * *

UNITED STATES PATENT AND TRADEMARK OFFICE
CERTIFICATE OF CORRECTION

PATENT NO. : 5,179,720
DATED : Jan. 12, 1993
INVENTOR(S) : Gary W. Grube, Carl B. Olson It is certified that error appears in the above-identified patent and that said Letters Patent is hereby corrected as shown below:

COLUMN 6

In claim 1, line 22, please delete the word "trucking" and substitute the word --trunking--.

In claim 1, line 23, please delete the word "od" and substitute the word --of--.

In claim 1, line 25, please delete the word "trucking" and substitute the word --trunking--.

In claim 2, line 46, please delete the word "trucking" and substitute the word --trunking--.

Signed and Sealed this

Twenty-third Day of November, 1993

Attest:

BRUCE LEHMAN

Attesting Officer

Commissioner of Patents and Trademarks